(12) United States Patent
Brown et al.

(10) Patent No.: US 11,068,598 B2
(45) Date of Patent: Jul. 20, 2021

(54) CHASSIS INTERNAL DEVICE SECURITY

(71) Applicant: Dell Products L.P., Round Rock, TX (US)

(72) Inventors: Michael Emery Brown, Austin, TX (US); Josh M. Pennell, Pflugerville, TX (US); Jacob R. Hutcheson, Round Rock, TX (US); Marshal F. Savage, Austin, TX (US); Nikhil Swarnakumar, Round Rock, TX (US); Rhushabh Bhandari, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 422 days.

(21) Appl. No.: 16/177,620

(22) Filed: Nov. 1, 2018

(65) Prior Publication Data
US 2020/0143059 A1    May 7, 2020

(51) Int. Cl.
*G06F 21/57* (2013.01)
*G06F 21/44* (2013.01)
(Continued)

(52) U.S. Cl.
CPC ........ *G06F 21/575* (2013.01); *G06F 12/1408* (2013.01); *G06F 21/33* (2013.01);
(Continued)

(58) Field of Classification Search
CPC .... G06F 21/575; G06F 21/445; G06F 21/572; G06F 21/6209; G06F 21/44; G06F 2212/1052; G06F 21/33; G06F 9/4406; G06F 21/602; G06F 9/4401; G06F 9/4416; G06F 12/1408; G06F 21/57; G06F 2221/0748; G06F 2211/1097; G06F 2221/212; G06F 2221/0753; H04L 63/083;
(Continued)

(56) References Cited

U.S. PATENT DOCUMENTS

| | | | |
|---|---|---|---|
| 6,684,326 B1 * | 1/2004 | Cromer | G06F 21/575 713/1 |
| 7,181,620 B1 * | 2/2007 | Hur | H04L 9/083 713/168 |

(Continued)

FOREIGN PATENT DOCUMENTS

| | | | | |
|---|---|---|---|---|
| EP | 3454245 A1 * | 3/2019 | | G06F 21/575 |
| WO | WO-2010102259 A2 * | 9/2010 | | G06F 21/44 |

*Primary Examiner* — David Garcia Cervetti
(74) *Attorney, Agent, or Firm* — Baker Botts L.L.P.

(57) ABSTRACT

Methods, systems, and computer programs encoded on computer storage medium, for verifying, by a mask ROM of a CPU of a first computing device and with fused keys included by the CPU, a boot loader that is included by a flash memory of the first computing device, in response to verifying the boot loader, verifying, by the boot loader and with boot loader keys included by the flash memory, a kernel included by the a memory device of the first computing device, in response to verifying the kernel, decrypting, by the kernel using a hidden root key (HRK) included by the CPU of the first computing device, a device unique certification (DUC) included by the flash memory, in response to decrypting the DUC, generating, by the first computing device, a proof-of-possession of the DUC.

17 Claims, 5 Drawing Sheets

(51) Int. Cl.
  *G06F 21/62* (2013.01)
  *G06F 21/33* (2013.01)
  *G06F 21/60* (2013.01)
  *G06F 12/14* (2006.01)

(52) U.S. Cl.
  CPC .......... *G06F 21/445* (2013.01); *G06F 21/602* (2013.01); *G06F 21/6209* (2013.01); *G06F 2211/1097* (2013.01); *G06F 2221/0748* (2013.01); *G06F 2221/0753* (2013.01); *G06F 2221/2129* (2013.01)

(58) Field of Classification Search
  CPC ... H04L 9/3268; H04L 9/3263; H04L 9/3247; H04L 63/08; H04L 63/10; H04L 63/0853; H04L 63/0428; H04L 63/0823; H04L 9/3234; H04L 9/321; H04L 9/0825; H04L 63/18; H04L 9/3271; H04W 12/06; H04W 12/08
  See application file for complete search history.

(56) References Cited

U.S. PATENT DOCUMENTS

| | | | | |
|---|---|---|---|---|
| 8,116,455 | B1* | 2/2012 | Sussland | H04L 9/0822 380/277 |
| 8,745,365 | B2* | 6/2014 | Jevans | G06F 21/575 713/2 |
| 9,391,980 | B1* | 7/2016 | Krahn | G06F 21/57 |
| 9,402,177 | B2* | 7/2016 | Hawkes | H04L 63/0442 |
| 10,057,243 | B1* | 8/2018 | Kumar | H04L 63/0823 |
| 10,382,413 | B1* | 8/2019 | Friel | H04L 9/0841 |
| 10,505,920 | B2* | 12/2019 | Kumar | G06F 21/575 |
| 10,521,618 | B1* | 12/2019 | Zhang | G06F 21/76 |
| 10,733,284 | B2* | 8/2020 | Broumas | G06F 21/53 |
| 10,855,674 | B1* | 12/2020 | Geusz | H04L 63/20 |
| 10,880,099 | B2* | 12/2020 | Kumar Ujjwal | G06F 21/577 |
| 2003/0196110 | A1* | 10/2003 | Lampson | H04L 63/0442 726/30 |
| 2004/0143710 | A1* | 7/2004 | Walmsley | B41J 2/04508 711/144 |
| 2005/0132357 | A1* | 6/2005 | Shell | G06F 21/51 717/174 |
| 2006/0095505 | A1* | 5/2006 | Zimmer | G06F 21/57 709/203 |
| 2006/0242405 | A1* | 10/2006 | Gupta | H04L 9/321 713/156 |
| 2010/0235912 | A1* | 9/2010 | Hermann | G06F 21/57 726/23 |
| 2011/0282915 | A1* | 11/2011 | Steer | H04L 9/3263 707/802 |
| 2012/0151223 | A1* | 6/2012 | Conde Marques | G06F 21/6218 713/193 |
| 2012/0185683 | A1* | 7/2012 | Krstic | G06F 21/575 713/2 |
| 2012/0266252 | A1* | 10/2012 | Spiers | H04L 9/3247 726/26 |
| 2013/0019110 | A1* | 1/2013 | Lee | H04L 63/0823 713/193 |
| 2013/0074156 | A1* | 3/2013 | Iftode | G06F 21/52 726/3 |
| 2013/0205378 | A1* | 8/2013 | Oba | G06F 21/44 726/7 |
| 2014/0047230 | A1* | 2/2014 | Khosravi | H04W 99/00 713/2 |
| 2015/0134942 | A1* | 5/2015 | Novak | G06F 21/72 713/2 |
| 2016/0036819 | A1* | 2/2016 | Zehavi | H04W 4/70 726/4 |
| 2016/0080377 | A1* | 3/2016 | Lambert | H04L 63/0485 713/171 |
| 2016/0094539 | A1* | 3/2016 | Suresh | H04L 67/40 726/7 |
| 2016/0205102 | A1* | 7/2016 | Perretta | H04L 63/0861 726/4 |
| 2016/0219029 | A1* | 7/2016 | Oshida | H04L 9/3247 |
| 2017/0169227 | A1* | 6/2017 | Rajcan | H04L 63/08 |
| 2017/0235956 | A1* | 8/2017 | Maletsky | H04L 63/08 726/1 |
| 2017/0235957 | A1* | 8/2017 | Maletsky | H04L 9/3242 713/168 |
| 2018/0091315 | A1* | 3/2018 | Singhal | G06F 21/575 |
| 2018/0181759 | A1* | 6/2018 | Smith | G06F 9/4416 |
| 2018/0212781 | A1* | 7/2018 | Keser | H04L 63/123 |
| 2018/0268146 | A1* | 9/2018 | Suryanarayana | G06F 21/33 |
| 2018/0268147 | A1* | 9/2018 | Silverstone | G06F 9/45558 |
| 2018/0314831 | A1* | 11/2018 | Liu | H04L 9/3263 |
| 2018/0373863 | A1* | 12/2018 | Domke | H04L 9/3236 |
| 2018/0373878 | A1* | 12/2018 | Jung | H04L 9/0861 |
| 2019/0042756 | A1* | 2/2019 | Lal | G06F 21/575 |
| 2019/0163912 | A1* | 5/2019 | Kumar | H04L 9/3247 |
| 2019/0266331 | A1* | 8/2019 | Sanchez Diaz | G06F 21/00 |
| 2019/0363894 | A1* | 11/2019 | Kumar Ujjwal | H04L 9/3268 |
| 2020/0034528 | A1* | 1/2020 | Yang | H04L 9/0861 |
| 2020/0082091 | A1* | 3/2020 | Areno | G06F 21/74 |
| 2020/0184077 | A1* | 6/2020 | Venkataraman | G06F 21/575 |
| 2020/0374700 | A1* | 11/2020 | Smith | H04L 9/3247 |

* cited by examiner

FIG. 4 though of an information handling system.

CHASSIS INTERNAL DEVICE SECURITY

BACKGROUND

Field of the Disclosure

The disclosure relates generally to information handling systems, and, more particularly, to a system and method for chassis internal device security.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in methods that includes identifying a plurality of computing devices, each of the computing devices including at least i) a central processing unit (CPU), a serial peripheral interface (SPI) flash memory, and an embedded multi-media card (EMMC); registering, by a first computing device of the plurality of computing devices, as a client of a second, differing computing device of the plurality of computing devices; in response to registering the first computing device as a client of the second computing device, authorizing the first computing device with the second computing device, the authorizing including: verifying, by a mask ROM of the CPU of the first computing device and with fused keys included by the CPU, a boot loader that is included by the SPI flash memory of the first computing device, in response to verifying the boot loader, verifying, by the boot loader and with boot loader keys included by the SPI flash memory, a kernel included by the EMMC of the first computing device, in response to verifying the kernel, decrypting, by the kernel using a hidden root key (HRK) included by the CPU of the first computing device, a device unique certification (DUC) included by the SPI flash memory, in response to decrypting the DUC, generating, by the first computing device, a proof-of-possession of the DUC, providing, by the first computing device, the proof-of-possession to the second computing device to authorize the first computing device as a client of the second computing device; and in response to authorizing the first computing device as a client of the second computing device, establishing, by the first computing device, a secure communication channel with the second computing device.

Other embodiments of these aspects include corresponding system, apparatus, and computer programs, configured to perform the actions of the methods, encoded on computer storage devices.

These and other embodiments may each optionally include one or more of the following features. For instance, the DUC is unique to the first computing device. Registering, by the second computing device, as a client of the first computing device; in response to registering the second computing device as a client of the first computing device, authorizing the second computing device with the first computing device, the authorizing including: verifying, by a mask ROM of the CPU of the second computing device and with fused keys included by the CPU, a boot loader that is included by the SPI flash memory of the second computing device, in response to verifying the boot loader, verifying, by the boot loader and with boot loader keys included by the SPI flash memory, a kernel included by the EMMC of the second computing device, in response to verifying the kernel, decrypting, by the kernel using a hidden root key (HRK) included by the CPU of the second computing device, an additional device unique certification (DUC) included by the SPI flash memory, in response to decrypting the additional DUC, generating, by the second computing device, a proof-of-possession of the additional DUC, providing, by the second computing device, the proof-of-possession to the first computing device to authorize the second computing device as a client of the first computing device; and in response to authorizing the second computing device as a client of the first computing device, establishing, by the second computing device, an additional secure communication channel with the first computing device.

The DUC of the first computing device is unique to the first computing device, and the additional DUC of the second computing device is unique to the second computing device. Denying a verification, by the mask ROM of the CPU of the first computing device and with the fused keys included by the CPU, the boot loader that is included by the SPI flash memory of the first computing device, and in response to denying the verification of the boot loader, preventing further booting of the first computing device. In response to verifying the boot loader, denying a verification, by the boot loader and with the boot loader keys included by the SPI flash memory, the kernel included by the EMMC of the first computing device, and in response to denying the verification of the kernel, disabling the HRK included by the CPU of the first computing device. In response to denying the verification of the kernel, forgoing decryption of the DUC included by the SPI flash memory of the first computing device. Each of the computing devices are physically included by a common chassis system. Registration, by the first computing device, as a client of the second computing device is initiated upon booting of the first computing device. The DUC is preloaded onto the first computing device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes methods, systems, and computer readable medium for chassis internal device security. Specifically, a chain of trust is established that facilities a verify boot of each computing device in a chassis system, and verification of communication between authorized devices. This verification is further through all of the various encrypted channels between the computing devices in the chassis system such that one is able to track back an unbroken chain of trust from each protocol back to the hardware root keys. Further, a hardware root of trust facilitates verification that all devices in the chassis are running signed code. In short, for each computing device, a mask ROM verifies a bootloader using fused keys. The bootloader then verifies a kernel using bootloader keys. The kernel then decrypts a device unique certificate (DUC) using a hidden root key (HRK). The signed certificate and a proof of possession of the DUC private key can be presented to other computing devices in the chassis system to provide evidence that the computing device is running signed code and can be trusted.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
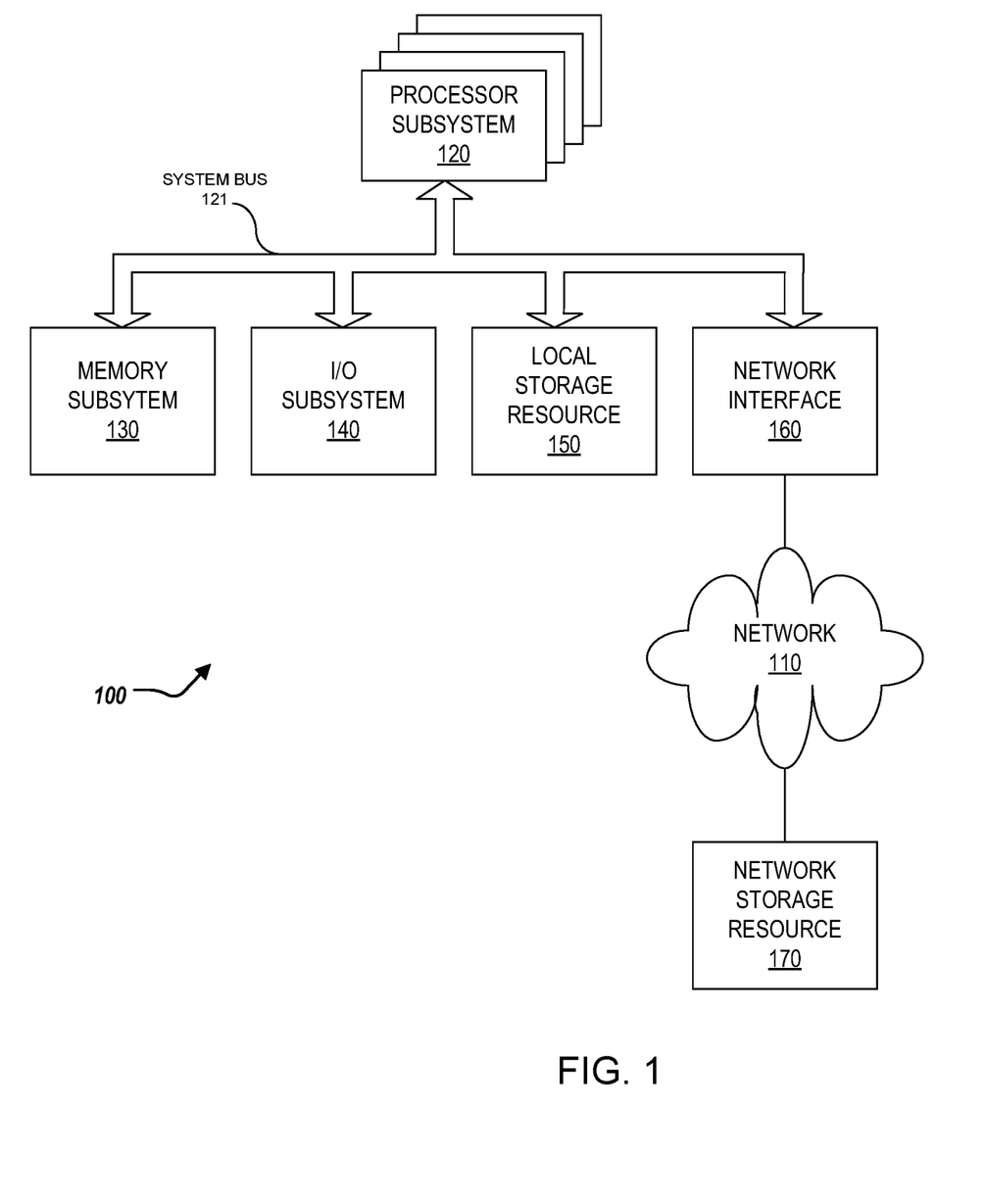
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
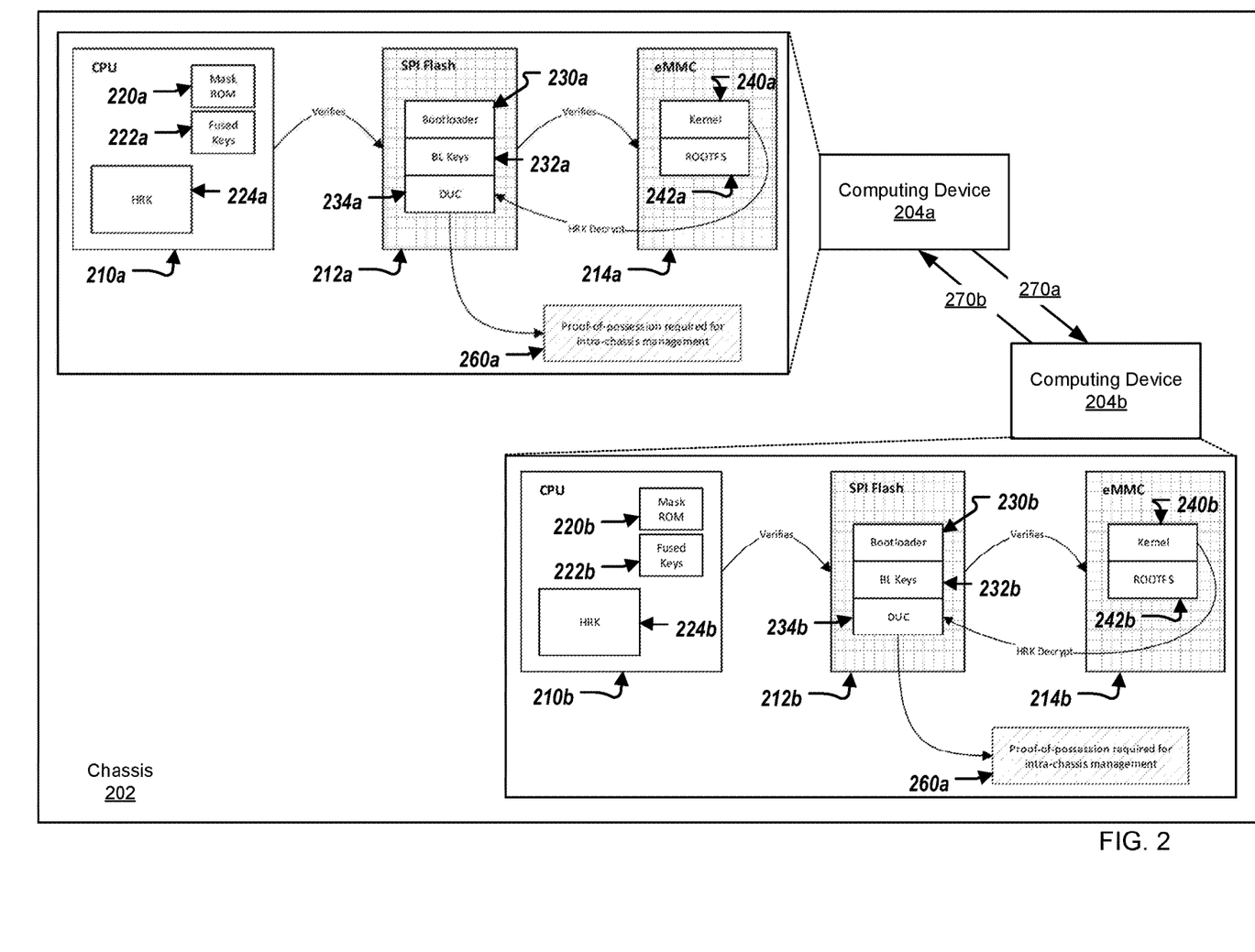
FIG. 2 illustrates an environment for chassis internal device security.

Turning now to FIG. 2, FIG. 2 depicts an environment 200 for chassis internal device security. The environment 200 includes a chassis system 202 that includes a first computing device 204a and a second computing device 204a (collectively referred to as computing devices 204). However, the chassis system 202 can include any number of computing systems. Further, the computing devices 204 can include any type of computing device typically included in a chassis system, such as a management service module (MSM), an enclosure controller (EC), integrated Dell remote access controller (iDRAC), or an input/output module (TOM). In some examples, the computing devices 204 include the information handling systems 100.

The first computing device 204a can include a central processing unit (CPU) 210a, a serial peripheral interface (SPI) flash memory 212a, and an embedded multi-media card (EMMC) 214a. The CPU 210a can include a mask ROM 220a, fused keys 222a, and a hidden root key (HRK) 224a. The SPI flash memory 212a can include a bootloader 230a, bootloader keys 232a, and device unique certification (DUC) 234a. The EMMC 214a can include a kernel 240a, and a root file system (ROOTFS) 242a. The DUC 234a can be unique to the first computing device 204a and preloaded onto the first computing device 204a (e.g., preloaded into the SPI flash memory 212a). The DUC 234a can be a public/private keypair that is encrypted with the HRK 224a, and is stored by the SPI flash memory 212a. The fused keys 222a can be public keys. The bootloader keys 232a can be a public signing key.

Similarly, the second computing device 204b can include a central processing unit (CPU) 210b, a serial peripheral interface (SPI) flash memory 212b, and an embedded multi-media card (EMMC) 214b. The CPU 210b can include a mask ROM 220b, fused keys 222b, and a hidden root key (HRK) 224b. The SPI flash memory 212b can include a bootloader 230b, bootloader keys 232b, and device unique certification (DUC) 234b. The EMMC 214b can include a kernel 240b, and a root file system (ROOTFS) 242b. The DUC 234b can be unique to the second computing device 204b and preloaded onto the second computing device 204b (e.g., preloaded into the SPI flash memory 212b). The DUC 234b can be a public/private keypair that is encrypted with the HRK 224b, and is stored by the SPI flash memory 212b. The fused keys 222b can be public keys. The bootloader keys 232b can be a public signing key.

In short, each of the computing systems 204 register and authenticate with the other such that each computing system 204 can trust one another. That is, each computing system 204 can be both a client and a server. As a result, the computing systems 204 can establish full bi-directional trust therebetween. To develop such trust from the first computing device 204a to the second computing device 204b, the mask ROM 220a verifies the bootloader 230a using the fused keys 222b; then the bootloader 230a verifies the kernel 240a using the bootloader keys 232a; then the kernel 240a decrypts the DUC 234a using the HRK 224a. The first computing device 204a can then generate a proof-of-possession of the DUC 234a for presenting to the second computing system 204b. Similarly, to develop such trust from the second computing device 204b to the first computing device 204a, the mask ROM 220b verifies the bootloader 230b using the fused keys 222a; then the bootloader 230b verifies the kernel 240b using the bootloader keys 232b; then the kernel 240b decrypts the DUC 234b using the HRK 224b. The second computing device 204b can then generate a proof-of-possession of the DUC 234b for presenting to the first computing system 204a.

Specifically, the first computing device 204a can register as a client of the second computing device 204b. The second computing device 240b can function as the server to the client status of the first computing device 204a. In some examples, the first computing device 204a is registered as a client of the second computing device 204b upon booting of the first computing device 204a. To that end, registration of the first computing device 204a can include multicast domain name system (MDNS) messages that are generated by the first computing device 204a and/or the second computing device 204b. The MDNS messages can include a list of challenges the second (server) computing device 204b support. The first (client) computing device 204a utilizes these challenges to verify the second computing device 204b. As a result, the first computing device 204a can verify that the data in the MDNS message regarding the device type and physical location of the second computing device 204b. Further, communication between the first computing device 204a and the second computing device 204b can be encrypted and transmitted over HTTPS.

In response to registering the first computing device 204a as a client of the second computing device 204b, the first computing device 204a can be authorized with the second computing device 204b. Specifically, the mask ROM 220a of the CPU 210a of the first computing device 204a verifies the bootloader 230a. That is, the mask ROM 220a, using the fused keys 222a included by the CPU 210a, verifies the bootloader 230a that is included by the SPI flash memory 212a of the first computing device 204a. In response to verifying the bootloader 230a, the bootloader 230a verifies the kernel 240a. That is, the bootloader 230a, using the bootloader keys 232a included by the SPI flash memory 212a, verifies the kernel 240a that included by the EMMC 214a of the first computing device 204a. In some examples, the bootloader 230a additionally verifies the ROOTFS 242a. In response to verifying the kernel 240a, the kernel 240a decrypts the DUC 234a. That is, the kernel 240a, using the HRK 224a included by the CPU 210a of the first computing system 204a, decrypts the DUC 234a included by the SPI flash memory 212a.

In response to decrypting the DUC 234a, the first computing device 204a can generate a proof-of-possession 260a of a signed DUC 234a. The first computing device 204a can provide the proof-of-possession 260a to the second computing device 204b to authorize the first computing device 204a as a client of the second computing device 204b. Specifically, the proof-of-possession 260a uses device 204a's TLS/SSL certificate that is encrypted based on the signed DUC 234a (private key) and the DUC 234b (public key) of the second computing device 204b to confirm that the computing device 204a possess the DUC 234a private key. In response, the first computing device 204a can establish a secure communication channel 270a with the second computing device 204b. The secure communication channel 270a can be associated with an encrypted protocol for encryption communication from the first computing device 204a to the second computing device 204b. Additionally, device 204b can validate that the decrypted TLS certificate from 260a matches the TLS certificate used in the secure connection it establishes with device 204a. This helps in eliminating potential man-in-the-middle attacks.

Similarly, in some examples, the second computing device 204b can register as a client of the first computing device 204a. The first computing device 240a can function as the server to the client status of the second computing device 204b. In some examples, the second computing device 204b is registered as a client of the first computing device 204a upon booting of the second computing device 204b. To that end, registration of the second computing device 204b can include multicast domain name system (MDNS) messages that is generated by the second computing device 204b and/or the first computing device 204a. The MDNS messages can include a list of challenges the first (server) computing device 204a support. The second (client) computing device 204b utilizes these challenges to verify the first computing device 204a. As a result, the second computing device 204b can verify that the data in the MDNS message regarding the device type and physical location of the first computing device 204a. Further, communication between the second computing device 204b and the first computing device 204a can be encrypted and transmitted over HTTPS.

In response to registering the second computing device 204b as a client of the first computing device 204a, the second computing device 204b can be authorized with the first computing device 204a. Specifically, the mask ROM 220b of the CPU 210b of the second computing device 202b, verifies the bootloader 230b. That is, the mask ROM 220b, using the fused keys 222b included by the CPU 210b, verifies the bootloader 230b that is included by the SPI flash memory 212b of the second computing device 202b. In response to verifying the bootloader 230b, the bootloader 230b verifies the kernel 240b. That is, the bootloader 230b, using the bootloader keys 232b included by the SPI flash memory 212b, verifies the kernel 240b that included by the EMMC 214b of the second computing device 204b. In some examples, the bootloader 230b additionally verifies the ROOTFS 242b. In response to verifying the kernel 240b, the kernel 240b decrypts the DUC 234b. That is, the kernel 240b, using the HRK 224b included by the CPU 210b of second first computing system 204b, decrypts the DUC 234b included by the SPI flash memory 212b.

In response to decrypting the DUC 234b, the second computing device 204b can generate a proof-of-possession 260b of a signed DUC 234b. The second computing device 204b can provide the proof-of-possession 260b to the first computing device 204a to authorize the second computing device 204b as a client of the first computing device 204a. Specifically, the proof-of-possession 260b uses device 204b's TLS/SSL certificate that is encrypted based on the signed DUC 234b (private key) and the DUC 234a (public key) of the first computing device 204a to confirm that the computing device 204b possess the DUC 234b private key. In response, the second computing device 204b can establish a secure communication channel 270b with the first computing device 204a. The secure communication channel 270b can be associated with an encrypted protocol for encryption communication from the second computing device 204b to the first computing device 204a. Additionally, device 204a can validate that the decrypted TLS certificate from 260b matches the TLS certificate used in the secure connection it establishes with device 204b. This helps in eliminating potential man-in-the-middle attacks.

To that end, as the secure communication channels 270a, 270b are established between the first computing device 204a and the second computing device 204b, a bi-directional trust is established between the first computing device 204a and the second computing device 204b.

In some examples, the mask ROM 220a of the CPU 210a of the first computing device 202a, can deny verification of the bootloader 230a. That is, the mask ROM 220a, using the fused keys 222a included by the CPU 210a, denies verification of the bootloader 230a that is included by the SPI flash memory 212a of the first computing device 202a. In response to denying the verification of the bootloader 230a, the CPU 210a and/or the mask ROM 220a can prevent further booting of the first computing device 202a.

Similarly, in some examples, the mask ROM 220b of the CPU 210b of the second computing device 202b, can deny verification of the bootloader 230b. That is, the mask ROM 220b, using the fused keys 222b included by the CPU 210b, denies verification of the bootloader 230b that is included by the SPI flash memory 212b of the second computing device 202b. In response to denying the verification of the bootloader 230b, the CPU 210b and/or the mask ROM 220b can prevent further booting of the second computing device 202b.

In some examples, in response to verifying the bootloader 230a, the bootloader 230a denies verification of the kernel 240a. That is, the bootloader 230a, using the bootloader keys 232a included by the SPI flash memory 212a, denies verification of the kernel 240a that is included by the EMMC 214a of the first computing device 204a. In response to denying the verification of the kernel 240a, the first computing device 204a disables the HRK 224a included by the CPU 210a of the first computing device 204a. In some examples, in response to denying the verification of the kernel 240a, the kernel 240a forgoes decryption of the DUC 234a included by the SPI flash memory 212a of the first computing device 204a.

Similarly, in some examples, in response to verifying the bootloader 230b, the bootloader 230b denies verification of the kernel 240b. That is, the bootloader 230b, using the bootloader keys 232b included by the SPI flash memory 212b, denies verification of the kernel 240b that is included by the EMMC 214b of the second computing device 204b. In response to denying the verification of the kernel 240b, the second computing device 204b disables the HRK 224b included by the CPU 210b of the second computing device 204b. In some examples, in response to denying the verification of the kernel 240b, the kernel 240b forgoes decryption of the DUC 234b included by the SPI flash memory 212ba of the second computing device 204b.

Figure 3A:
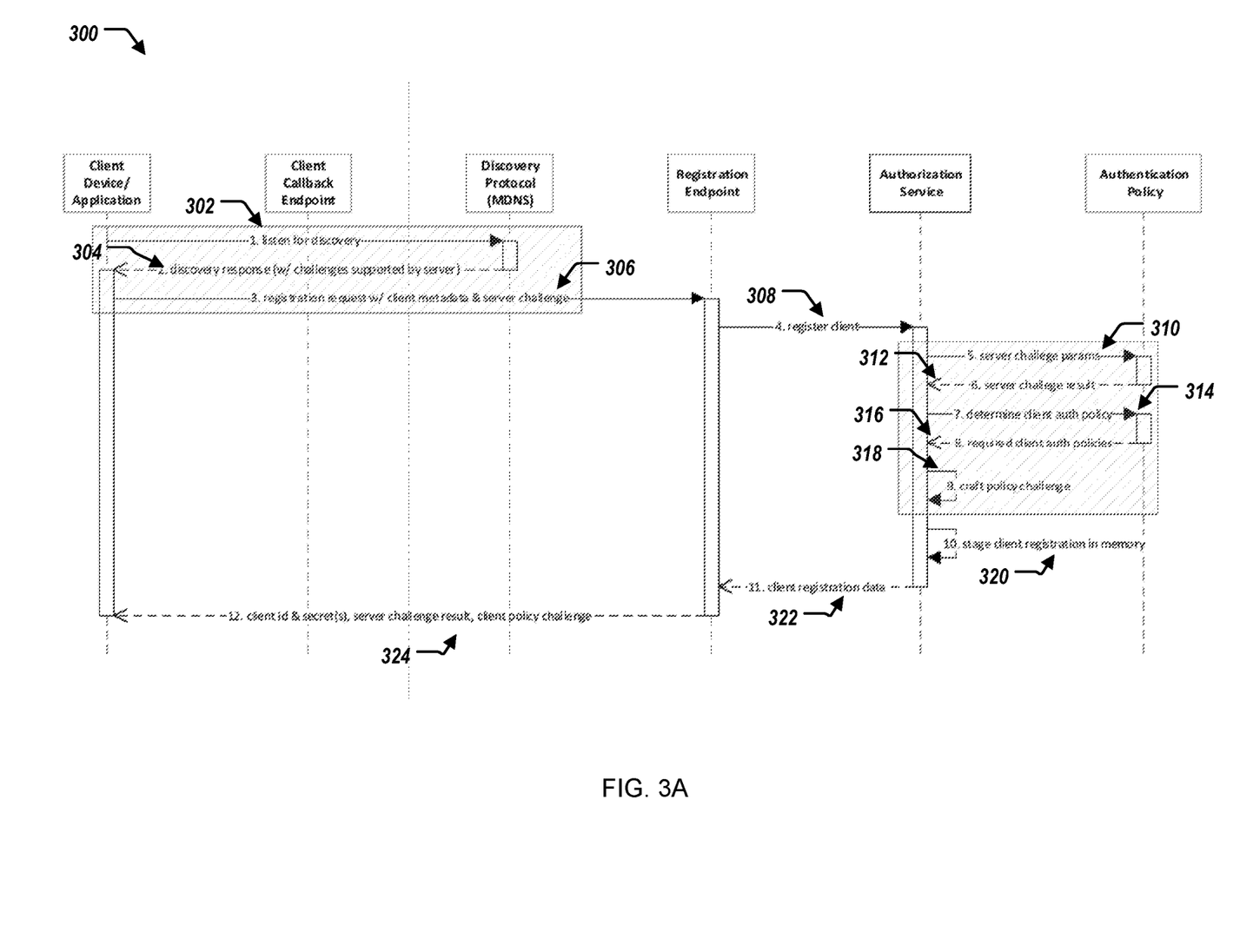
FIGS. 3A and 3B illustrate a flowchart for client registration and authorization.
Figure 3B:
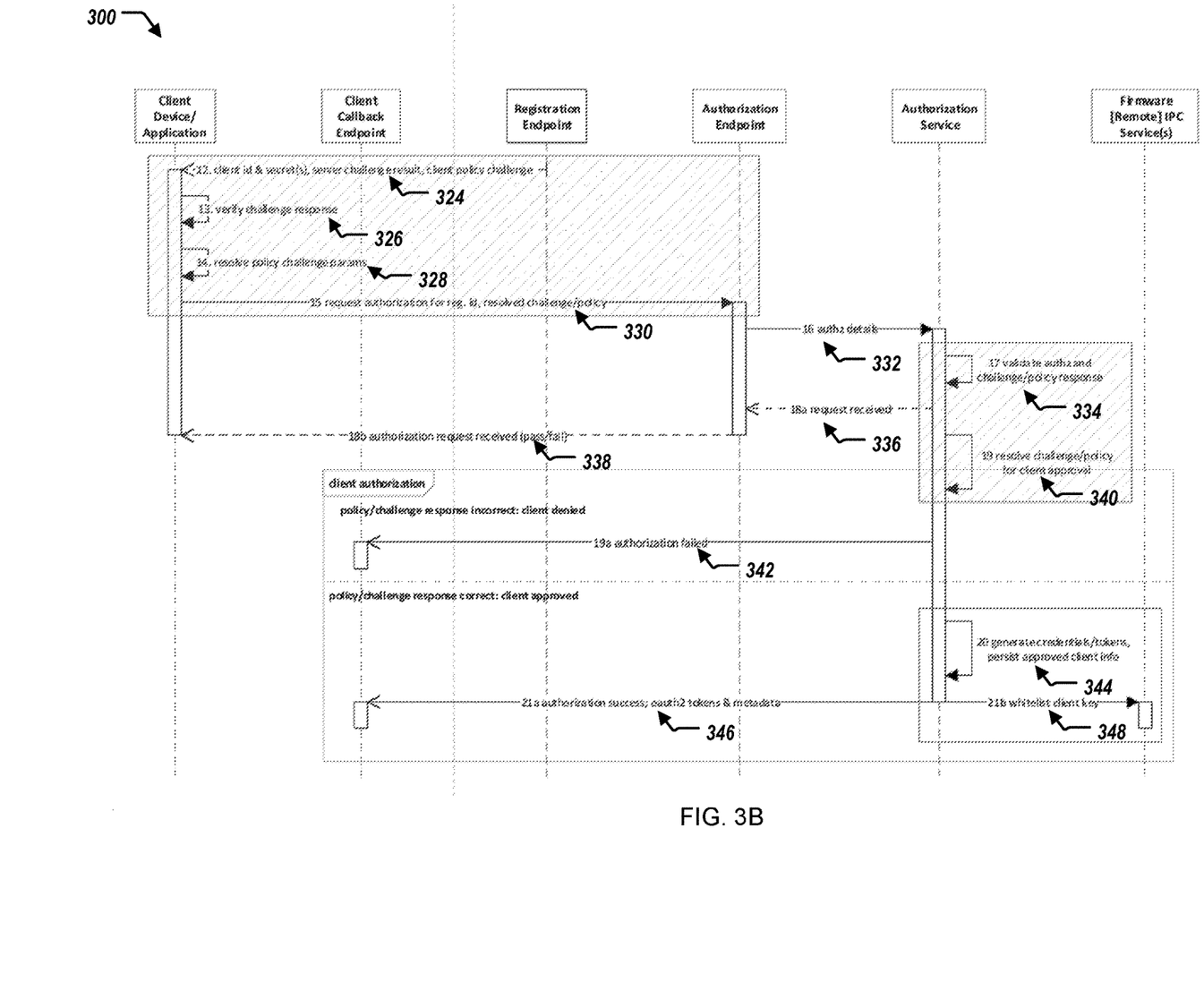

FIGS. 3A, 3B illustrates a diagram depicting selected elements of an embodiment of a method 300 for client registration and authorization. The method 300 may be performed by the information handling system 100 and/or computing devices 204 described herein with reference to FIGS. 1 and 2, or another information handling system. It is noted that certain operations described in method 300 may be optional or may be rearranged in different embodiments.

The first computing device 204a can listen for discovery from a discovery protocol (MDNS) of the second computing device 204b (302). The discovery protocol of the second computing device 204b provides a discovery response (with challenges supported by the second computing device 204b) to the first computing device (304). The first computing device 204a provides a registration request with client metadata and server challenge to a registration endpoint of the second computing device 204b (306). The registration endpoint registers the first computing device 204a as a client (308). The authorization service of the second computing device 204b communicates with an authorization policy of the second computing device 204b, including establishing server challenge parameters (310); a server challenge result (312); determine the client authorization policy (314); identify required client authorization policies (316); craft policy challenge (318); and stage client registration in memory (320). The authorization service provides client registration data to the registration endpoint (322). The registration endpoint provides client identification and secrets, server challenge results, and client policy challenge to the first computing device 204a (324). The first computing device 204a verifies the challenge response (326), resolves the policy challenge parameters (328), and requests authorization for registration identification, and resolved challenge/policy to the authorization endpoint of the second computing device 204b (330). The authorization endpoint provides authorization details to the authorization service (332), and the authorization service validates the authorization and challenge/policy response (334). In some examples, the authorization service provides the request to the authorization endpoint (336) and the authorization endpoint provides the authorization request (pass/fail) to the first computing device 204a (338). In some examples, the authorization service resolves the challenge/policy for client approval (340) and determines that the policy/challenge response is incorrect and client authorization is denied (342). The authorization service can also generate credentials/tokens (344) and determines that the policy/challenge response is correct, and the client is approved (346), and generate a whitelist client key (348).

Figure 4:
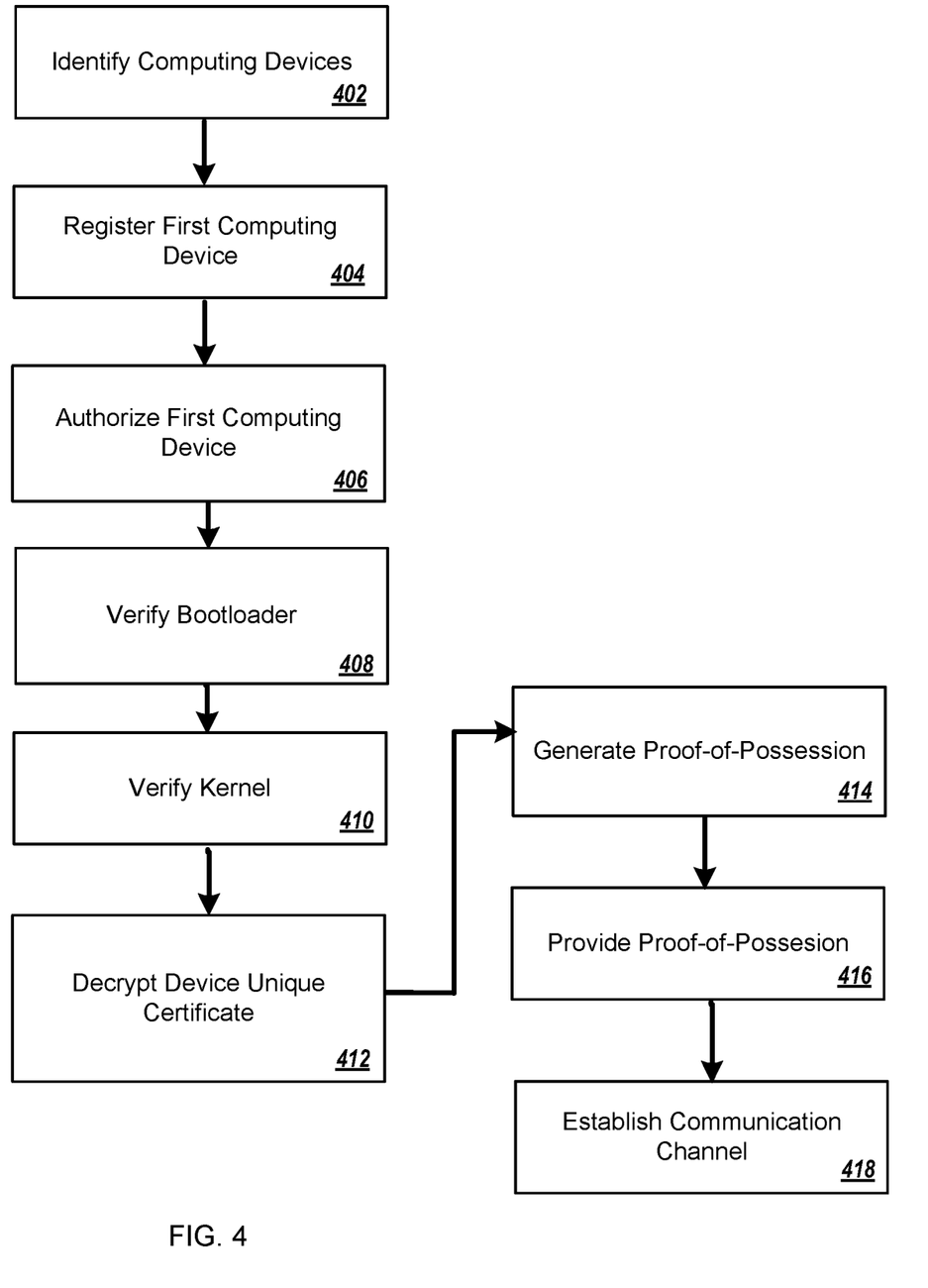
FIG. 4 illustrates a flowchart for chassis internal device security.

FIG. 4 illustrates a flowchart depicting selected elements of an embodiment of a method 400 for chassis internal device security. The method 400 may be performed by the information handling system 100 and/or the computing devices 204 described herein with reference to FIGS. 1 and 2, or another information handling system. It is noted that certain operations described in method 400 may be optional or may be rearranged in different embodiments.

A plurality of computing devices are identified, each of the computing devices including at least i) a central processing unit (CPU), a serial peripheral interface (SPI) flash memory, and an embedded multi-media card (EMMC) (402). The first computing device 204a can register as a client of the second computing device 204b (404). The first computing device 204a can be authorized with the second computing device 204b (406). Specifically, the mask ROM 220a of the CPU 210a of the first computing device 204a, verifies the bootloader 230a (408). That is, the mask ROM 220a, using the fused keys 222a included by the CPU 210a, verifies the bootloader 230a that is included by the SPI flash memory 212a of the first computing device 204a. In response to verifying the bootloader 230a, the bootloader 230a verifies the kernel 240a (410). That is, the bootloader 230a, using the bootloader keys 232a included by the SPI flash memory 212a, verifies the kernel 240a that included by the EMMC 214a of the first computing device 204a. In response to verifying the kernel 240a, the kernel 240a decrypts the DUC 234a (412). That is, the kernel 240a, using the HRK 224a included by the CPU 210a of the first computing system 204a, decrypts the DUC 234a included by the SPI flash memory 212a. In response to decrypting the DUC 234a, the first computing device 204a can generate a proof-of-possession 260a of a signed DUC 234a (414). The first computing device 204a can provide the proof-of-possession 260a to the second computing device 204b to authorize the first computing device 204a as a client of the second computing device 204b (416). In response, the first computing device 204a can establish a secure communication channel 270a with the second computing device 204b (418).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
    identifying a plurality of computing devices, each of the computing devices including at least a central processing unit (CPU), a flash memory, and a memory device;
    registering, by a first computing device of the plurality of computing devices, as a client of a second, differing computing device of the plurality of computing devices;
    in response to registering the first computing device as a client of the second computing device, authorizing the first computing device with the second computing device, the authorizing including:
        verifying, by a mask ROM of the CPU of the first computing device and with fused keys included by the CPU, a boot loader that is included by the flash memory of the first computing device;
        in response to verifying the boot loader, verifying, by the boot loader and with boot loader keys included by the flash memory, a kernel included by the memory device of the first computing device;
        in response to verifying the kernel, decrypting, by the kernel using a hidden root key (HRK) included by the CPU of the first computing device, a device unique certification (DUC) included by the flash memory;
        in response to decrypting the DUC, generating, by the first computing device, the proof-of-possession of the DUC;
    providing, by the first computing device, the proof-of-possession to the second computing device to authorize the first computing device as a client of the second computing device; and
    in response to authorizing the first computing device as a client of the second computing device, establishing, by the first computing device, a secure communication channel with the second computing device.

2. The computer-implemented method of claim 1, wherein the DUC is unique to the first computing device.

3. The computer-implemented method of claim 1, further comprising:
    registering, by the second computing device, as a client of the first computing device;
    in response to registering the second computing device as a client of the first computing device, authorizing the second computing device with the first computing device, the authorizing including a chain of verification steps that verifies in sequence each step of a boot process by the previous step to generate a proof-of-possession of an additional device unique certification (DUC);
    providing, by the second computing device, the proof-of-possession to the first computing device to authorize the second computing device as a client of the first computing device; and
    in response to authorizing the second computing device as a client of the first computing device, establishing, by the second computing device, an additional secure communication channel with the first computing device.

4. The computer-implemented method of claim 3, wherein authorizing the second computing device with the first computing device further comprises:
    verifying, by a mask ROM of the CPU of the second computing device and with fused keys included by the CPU, a boot loader that is included by the flash memory of the second computing device;
    in response to verifying the boot loader, verifying, by the boot loader and with boot loader keys included by the flash memory, a kernel included by the memory device of the second computing device;
    in response to verifying the kernel, decrypting, by the kernel using a hidden root key (HRK) included by the CPU of the second computing device, an additional device unique certification (DUC) included by the flash memory; and
    in response to decrypting the additional DUC, generating, by the second computing device, the proof-of-possession of the additional DUC.

5. The computer-implemented method of claim 4, further comprising:
    providing, to the second computing device and from the first computing device, a public portion of the DUC;
    verifying, by the second computing device, a root of trust signature on the DUC;
    in response to verifying the root of trust signature on the DUC, creating a key based on the public portion of the DUC and a private portion of the additional DUC to encrypt a SSL certificate of the second computing device;

providing, to the first computing device and from the second computing device, the encrypted SSL certificate and a public portion of the additional DUC;

combining, by the first computing device, the public portion of the additional DUC with a private portion of the DUC to decrypt the SSL certificate; and verifying, by the first computing device, the SSL certification.

6. The computer-implemented method of claim 3, wherein the DUC of the first computing device is unique to the first computing device, and the additional DUC of the second computing device is unique to the second computing device.

7. The computer-implemented method of claim 1, further comprising:

denying a verification, by the mask ROM of the CPU of the first computing device and with the fused keys included by the CPU, the boot loader that is included by the flash memory of the first computing device, and in response to denying the verification of the boot loader, preventing further booting of the first computing device.

8. The computer-implemented method of claim 1, further comprising:

in response to verifying the boot loader, denying a verification, by the boot loader and with the boot loader keys included by the flash memory, the kernel included by the memory device of the first computing device, and in response to denying the verification of the kernel, disabling the HRK included by the CPU of the first computing device.

9. The computer-implemented method of claim 8, further comprising:

in response to denying the verification of the kernel, forgoing decryption of the DUC included by the flash memory of the first computing device.

10. The computer-implemented method of claim 1, wherein each of the computing devices are physically included by a common chassis system.

11. The computer-implemented method of claim 1, wherein registration, by the first computing device, as a client of the second computing device is initiated upon booting of the first computing device.

12. The computer-implemented method of claim 1, wherein the DUC is preloaded onto the first computing device and is signed by a private key of a root of trust.

13. A system comprising a processor having access to memory media storing instructions executable by the processor to perform operations comprising:

identifying a plurality of computing devices, each of the computing devices including at least a central processing unit (CPU), a flash memory, and a memory device;

registering, by a first computing device of the plurality of computing devices, as a client of a second, differing computing device of the plurality of computing devices;

in response to registering the first computing device as a client of the second computing device, authorizing the first computing device with the second computing device, the authorizing including:

verifying, by a mask ROM of the CPU of the first computing device and with fused keys included by the CPU, a boot loader that is included by the flash memory of the first computing device;

in response to verifying the boot loader, verifying, by the boot loader and with boot loader keys included by the flash memory, a kernel included by the memory device of the first computing device;

in response to verifying the kernel, decrypting, by the kernel using a hidden root key (HRK) included by the CPU of the first computing device, a device unique certification (DUC) included by the flash memory; and in response to decrypting the DUC, generating, by the first computing device, the proof-of-possession of the DUC;

providing, by the first computing device, the proof-of-possession to the second computing device to authorize the first computing device as a client of the second computing device; and in response to authorizing the first computing device as a client of the second computing device, establishing, by the first computing device, a secure communication channel with the second computing device.

14. The system of claim 13, wherein the DUC is unique to the first computing device.

15. The system of claim 13, the operations further comprising:

registering, by the second computing device, as a client of the first computing device;

in response to registering the second computing device as a client of the first computing device, authorizing the second computing device with the first computing device, the authorizing including a chain of verification steps that verifies in sequence each step of a boot process by the previous step to generate a proof-of-possession of an additional device unique certification (DUC);

providing, by the second computing device, the proof-of-possession to the first computing device to authorize the second computing device as a client of the first computing device; and in response to authorizing the second computing device as a client of the first computing device, establishing, by the second computing device, an additional secure communication channel with the first computing device.

16. The system of claim 15, wherein authorizing the second computing device with the first computing device further comprises:

verifying, by a mask ROM of the CPU of the second computing device and with fused keys included by the CPU, a boot loader that is included by the flash memory of the second computing device;

in response to verifying the boot loader, verifying, by the boot loader and with boot loader keys included by the flash memory, a kernel included by the memory device of the second computing device;

in response to verifying the kernel, decrypting, by the kernel using a hidden root key (HRK) included by the CPU of the second computing device, an additional device unique certification (DUC) included by the flash memory; and in response to decrypting the additional DUC, generating, by the second computing device, the proof-of-possession of the additional DUC.

17. A non-transitory computer-readable medium storing software comprising instructions executable by one or more computers which, upon such execution, cause the one or more computers to perform operations comprising:

identifying a plurality of computing devices, each of the computing devices including at least a central processing unit (CPU), a flash memory, and a memory device;

registering, by a first computing device of the plurality of computing devices, as a client of a second, differing computing device of the plurality of computing devices;

in response to registering the first computing device as a client of the second computing device, authorizing the first computing device with the second computing device, the authorizing including:

verifying, by a mask ROM of the CPU of the first computing device and with fused keys included by the CPU, a boot loader that is included by the flash memory of the first computing device;

in response to verifying the boot loader, verifying, by the boot loader and with boot loader keys included by the flash memory, a kernel included by the memory device of the first computing device;

in response to verifying the kernel, decrypting, by the kernel using a hidden root key (HRK) included by the CPU of the first computing device, a device unique certification (DUC) included by the flash memory; and         in response to decrypting the DUC, generating, by the first computing device, the proof-of-possession of the DUC;

providing, by the first computing device, the proof-of-possession to the second computing device to authorize the first computing device as a client of the second computing device; and     in response to authorizing the first computing device as a client of the second computing device, establishing, by the first computing device, a secure communication channel with the second computing device.

\* \* \* \* \*